US006465081B2

(12) United States Patent
Sarkar et al.

(10) Patent No.: US 6,465,081 B2
(45) Date of Patent: Oct. 15, 2002

(54) IMAGE RECEPTOR SHEET

(75) Inventors: Manisha Sarkar, Austin, TX (US); James P. DiZio, St. Paul, MN (US); David J. Kinning, Woodbury, MN (US); John W. Vanderzanden, Maplewood, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/835,689

(22) Filed: Apr. 16, 2001

(65) Prior Publication Data

US 2002/0022118 A1 Feb. 21, 2002

Related U.S. Application Data

(60) Provisional application No. 60/197,915, filed on Apr. 17, 2000.

(51) Int. Cl.[7] .......................... B32B 27/14; B32B 3/00

(52) U.S. Cl. ...................... 428/195; 428/323; 428/327; 428/423.1; 428/480; 428/500

(58) Field of Search ............................ 428/195, 327, 428/206, 423.1, 212, 480, 323, 500

(56) References Cited

U.S. PATENT DOCUMENTS

| | | | | |
|---|---|---|---|---|
| 2,532,011 A | | 11/1950 | Dalquist et al. | 154/53.5 |
| 3,889,270 A | | 6/1975 | Hoffmann et al. | 346/1 |
| 4,379,804 A | | 4/1983 | Eisele et al. | 428/332 |
| 4,503,111 A | | 3/1985 | Jaeger et al. | 428/195 |
| 4,555,437 A | | 11/1985 | Tanck | 428/212 |
| 4,564,560 A | | 1/1986 | Tani et al. | 428/411.1 |
| 5,134,198 A | | 7/1992 | Stofko, Jr. et al. | 525/205 |
| 5,214,119 A | | 5/1993 | Leir et al. | 528/28 |
| 5,238,736 A | | 8/1993 | Tseng et al. | 428/327 |
| 5,264,275 A | | 11/1993 | Misuda et al. | 428/304.4 |
| 5,290,615 A | | 3/1994 | Tushaus et al. | 428/40 |
| 5,342,688 A | | 8/1994 | Kitchin et al. | 428/402 |
| 5,624,747 A | | 4/1997 | Sarkar et al. | 428/327 |
| 5,723,211 A | | 3/1998 | Romano et al. | 428/328 |
| 5,885,698 A | * | 3/1999 | Takehana et al. | 428/212 |
| 5,897,940 A | | 4/1999 | Malhotra | 428/212 |
| 5,908,723 A | | 6/1999 | Malhotra et al. | 430/31 |
| 5,916,673 A | | 6/1999 | Fryberg et al. | 428/328 |
| 5,990,238 A | | 11/1999 | DiZio et al. | 525/60 |
| 6,022,677 A | | 2/2000 | Bourdelais et al. | 430/496 |
| 6,214,458 B1 | * | 4/2001 | Kobayashi et al. | 428/332 |

FOREIGN PATENT DOCUMENTS

| | | |
|---|---|---|
| EP | 0791475 A2 | 8/1997 |
| JP | 7179025 | 7/1995 |
| WO | WO 96/21565 | 7/1996 |

OTHER PUBLICATIONS

PCT International Search Report, PCT/US01/12431 mailed Sep. 30, 2001.

Wu, Souheng, *Polymer Interface and Adhesion,* Marcel Dekker, Inc., New York and Basel, pp. 178–181, 1982.

* cited by examiner

*Primary Examiner*—Bruce H. Hess
*Assistant Examiner*—B. Shewareged
(74) *Attorney, Agent, or Firm*—Yen Tong Florczak

(57) ABSTRACT

A liquid ink repellent coating adapted to prevent transfer of fluid image forming ink droplets between imaged sheets in a stack of multiple printed impressions. The repellent coating comprises a polymeric composition having a surface energy less than about 30 $mJ/m^2$ and an insoluble particulate filler as a matting agent.

8 Claims, No Drawings

IMAGE RECEPTOR SHEET

CROSS-REFERENCE TO RELATED APPLICATION

This application claims priority from U.S. Provisional Application Ser. No. 60/197,915 filed on Apr. 17, 2000.

TECHNICAL FIELD

The invention relates to coatings applied to film materials to provide receptor elements for images generated by inkjet printers. More particularly, the invention relates to films having an inkjet image receptor coating on one side and an ink repellent coating on the other to allow contact between a plurality of imaged sheets, during printing, without smearing of ink droplets before an image dries.

BACKGROUND

Printing methods, including inkjet printing and electrophotographic or laser printing have achieved widespread acceptance, for home and office use, to print text and graphic images on a variety of receptor substrates such as paper and films. The films may be used as transparency film for overhead projectors. Inkjet printers are well suited for use with paper substrates that rapidly absorb the image forming ink droplets, drawing them away from the paper receptor surface into the fibrous bulk of the sheet. Migration of the ink droplets into the paper sheet prevents lowering of image quality that could occur if a still-wet image was smeared in some way.

Film materials, unlike paper, have no inherent capacity to absorb inks that are commonly used in inkjet printers. The capture of the image-forming ink droplets on transparency film presents a technical challenge because plastic film is substantially impervious to liquids. A conventional way for forming an ink-receptive surface involves coating the surface of the film with an ink receptive layer. Typically a hydrophilic coating (the ink receptive layer) absorbs ink droplets to minimize loss of image definition that maybe caused by ink migration or bleeding across the film surface.

Hydrophilic coatings, applied to film materials, are known to provide receptor layers for inkjet images. Receptor layers of this type may be porous for absorbing ink droplets via capillary action. Such coatings are described, for example, in U.S. Pat. No. 5,264,275. An alternative type of absorbent inkjet receptive coating comprises polymers that swell while absorbing image forming ink droplets. Such coatings include those described in U.S. Pat. Nos. 3,889,270, 4,503,111, 4,564,560, 4,555,437, 4,379,804, 5,134,198 and 5,342,688. Hydrophilic inkjet-receptive coatings may also include multilayer coatings as described in U.S. Pat. No. 4,379,804.

In addition to an inkjet image receptor coating, a film sheet of inkjet printable media may require further treatment to control the physical properties of the sheet such as surface roughness, static charge accumulation, and curl-set. Backside coatings, opposite the ink receptive coating, may provide surface roughness to assist sheet feeding through the transport rollers of an inkjet printer. Application of antistatic coatings and related treatments curtail the accumulation of static charge that may cause feeding and stacking problems between sheets. A very common function of backside coating on inkjet receptive sheets is control of curl. Under low humidity conditions the ink-receptive coating may lose water to the atmosphere, resulting in overall shrinkage of the layer. This places consequent stress on one side of a flexible substrate causing the film to adopt a curl-set usually towards the image-bearing surface. Therefore it has become common practice to coat a hydrophilic, moisture absorbing coating on the backside of the flexible substrate to counteract the image-side curl. The backside coating may, itself, be an inkjet receptive layer, such that the construction is symmetrical having no preferred orientation during deposition of an inkjet image.

US Patents, including U.S. Pat. Nos. 6,022,677, 5,916,673 and 5,723,211, describe inkjet media backside coatings for controlling physical properties as discussed above. Many of these backside coating formulations were developed for paper and other opaque substrates and may be unsuitable for transparency film applications, especially if the coating itself is not completely transparent.

Improvements in inkjet image receptive coatings and physical property control of text and graphic image recording plastic sheets has allowed an increase in the sheets-per-minute output of inkjet printers. A continuing constraint on the print speed for relatively impervious substrates, such as plastic film, is the rate of image forming droplet absorption by the ink receptive layer. Inkjet printers generally stack the printed output copies, automatically, into an output tray. If the image on one sheet is not dry to the touch before release of a following sheet into the output tray, ink from the wet image, will often transfer to the backside of the next overlying sheet in the stack.

The problem of image transfer between relatively impervious sheets becomes more severe when the sheet is a transparent film bearing text and graphic images for presentation using an enlarging projector, such as an overhead projector. Images deposited on transparency film usually will be high contrast images to avoid the appearance of a washed-out projected image focused on a projection screen. High contrast images may require a higher ink loading to achieve optimum optical density compared to images deposited against a white background such as paper that is viewed by reflected light. As might be expected, the higher ink loading requires a longer drying time. Delayed drying potentially leads to an increasing amount of image transfer or offset between adjacent sheets. For this reason, manufacturers of inkjet printers have generally found it necessary to slow the print rate when printing film transparencies for projection.

In view of the above described deficiencies associated with the use of known inkjet image receptor films, particularly offset of the image formed by ink droplets, the present invention has been developed to alleviate these drawbacks and provide further improvement. These enhancements and benefits are described in greater detail hereinbelow with respect to several alternative embodiments of the present invention.

SUMMARY

In its several disclosed embodiments, the present invention alleviates the drawbacks described above with respect to impervious films containing coatings that provide receptor elements for inkjet images. Of particular interest is the use of dissimilar coatings on opposing sides of image receptor sheets. Differences in these coatings minimize, if not deter ink transfer, also referred to herein as image offset, between adjacent surfaces of sheets of a stack produced in the output tray of a printer during inkjet printing.

In a majority of printing and copying methods, the printing equipment used to produce multiple impressions establishes precise positioning of a receptor sheet for image transfer before ejecting the sheet into an output tray. The orientation of the ejected sheet usually places the recently applied image pattern on the exposed, upward facing surface of the sheet. The next sheet to be ejected from the printing equipment may slide across the exposed imaged surface before settling over the previous sheet. With continued operation of a printer, a stack of sheets will form having upward-facing, imaged surfaces in contact with the downward facing surface or backside of the next higher sheet in the stack. The upward-facing image may not be in a fully fixed or in a permanent condition before contact with the backside of the next sheet in the printing sequence. This condition is especially true for inkjet images produced by image forming droplets. Sliding contact between sheets exiting the inkjet printer may cause smearing of still-wet images. Also, contact of adjacent sheets in a stacked configuration may lead to ink transfer or smearing, due to ink migration across the interface between an imaged surface and the backside of its nearest neighbor. Use of coated films according to the present invention substantially eliminates image smearing and image offset problems that occur by ink migration between sheets. Reduction or elimination of ink migration involves applying a non-wetting or ink-repellent coating to the backside of the film. Such coatings were discovered also to be beneficially receptive to toner powders used with electrophotographic printers. This discovery resulted in the development of a dual-purpose receptor element suitable for use with both inkjet and electrophotographic printers.

In brief summary, the present invention provides an image receptor sheet comprising (a) a substrate having first and second surfaces, (b) an ink-receptive coating disposed on the first surface, and (c) an ink repellent layer disposed on said second side to prevent transfer of ink from said first side to said second side, said ink repellent layer comprising (i) a polymeric composition having a surface energy less than about 30 $mJ/m^2$; and (ii) an insoluble particulate filler as a matting agent. In one embodiment, the ink repellent coating is also toner powder receptive thus allowing the image receptor sheet to be used in electrographic printers. Each of these components is discussed below in detail.

DETAILED DESCRIPTION

Substrates

Manufacture of the inventive image receptor sheets includes the selection of a substrate for coating on one side with an ink receptive single or multilayer coating and on the other side with a non-wetting, ink repellent single or multilayer coating. For use as image sheets with projection equipment the substrate and coated layers will be substantially transparent, meaning that it transmits light of about 400 to 700 nm in wavelength. The substrates are preferably substantially impervious to liquids, such as inks. In this document, the term "about" shall be assumed to modify numerical values, such as dimensions, time, temperature, percentages, whether expressly stated or not.

Suitable substrates include a wide range of flexible plastic films including cellulose esters such as cellulose triacetate or diacetate, polystyrene, polyamides, vinyl chloride polymers and copolymers, polyolefin and polyallomer polymers and copolymers, polysulphones, polycarbonates, and polyesters. The substrates are 50 to 125 micrometers in thickness. Preferred film substrates are cellulose triacetate or cellulose diacetate, polyesters, especially poly(ethylene terephthalate), and polystyrene films, with poly(ethylene terephthalate) having a thickness of 105 to 125 micrometers being most preferred.

When polyester or polystyrene substrates are used, they are preferably biaxially oriented, and may also be heat set for dimensional stability during fusion of the image to the support. These films may be produced by any conventional method in which the film is biaxially stretched to impart molecular orientation and is dimensionally stabilized by heat setting.

To promote adhesion of the ink-receptive layer to the substrate, it may be desirable to treat the surface of the substrate with one or more primers, in single or multiple layers. Useful primers include those known to have a swelling effect on the substrate. Examples include halogenated phenols dissolved in organic solvents. Alternatively, the surface of the film backing may be modified by treatment such as corona treatment or plasma treatment. The primer layer, when used, should be relatively thin, preferably less than 2 micrometers, more preferably less than 1 micrometer, and may be coated by conventional coating methods.

Ink Repellent Coating

A distinguishing feature of the present invention relates to the use of a non-wetting surface coating that substantially repels a wide range of fluid compositions thereby preventing their transfer to the non-wetting surface. Repulsion of a fluid medium at a given surface depends upon the surface tension of the fluid and the surface energy of the material with which the fluid may come into contact. For the fluid to migrate towards the surface, the fluid first wets the surface then shows a tendency to spread over it. Spreading tendency may be indicated by the contact angle of the fluid with a surface. Relatively low contact angles indicate wetting, while measurement of relatively high contact angles coincides with poor surface wetting and the possible formation of beads of fluid that have little affinity for the surface to which they are applied.

Surfaces exhibiting low surface energy, below about 30 $mJ/m^2$, preferably below 25 $mJ/m^2$, tend to repel both aqueous and solvent-based fluids. The term "solvent" refers herein to solvents used in inkjet compositions. Coatings then become discontinuous layers with substantial beading of liquid droplets. Liquids responding in this way may be easily removed, without leaving any surface residue, because they have little affinity for the surface. This condition is desirable to prevent the transfer of image forming droplets of inkjet ink. As previously discussed, a sheet having an upward facing imaged surface in contact with a backside of the next higher sheet produces an interface including an ink receptive surface separated from a non-wetting surface when the backside comprises an ink repellent coating. Image forming liquid droplets may span the gap between the ink receptive and ink repellent surfaces. The ink droplets may contact both sides of the interface. Because the backside coating has sufficient repellency, there will be no ink transfer during contact of a still-wet inkjet image with the backside of an adjacent neighboring sheet. Addition of insoluble particles, such as polymeric microspheres, to backside coatings appears to further reduce the tendency the transfer of wet inkjet images across the interface between adjacent imaged sheets.

It is known that inkjet ink formulations contain amounts of solvents, ionic solutes, surfactants and the like to facilitate image deposition on a wide range of substrates. Such formulations can complicate the preparation of the inventive image receptor sheet, according to the present invention. The image receptor sheet has an ink repellent coating that exhibit substantially no spreading tendency. U.S. Pat. No. 5,624,747 discloses useful and suitable low surface energy coatings.

Non-wetting, ink repellent backside coatings according to the present invention have surface energies less than about 40 $mJ/m^2$, more preferably less than 35 $mJ/m^2$, and most preferably less than 30 $mJ/m^2$. Surface energy testing can be accomplished according to a test method described herein. Selection of a fluid repellent coating takes into account its surface energy relative to the surface tension of inkjet inks. Such inks exhibit surface tensions in the range 30 to 50 dynes per cm, more commonly 35 to 45 dynes per cm.

Suitable ink repellent coatings may be manufactured from water insoluble polymers, especially polymers containing hydrocarbon groups, silicon atoms or fluorine atoms or combinations thereof. Useful ink repellent coatings are release coatings that exhibit low surface energy and maintain their chemical structure when exposed to inkjet inks.

Particularly useful are repellent coatings include (a) water borne urethane release coating such as the class of polymers described in U.S. Pat. No. 5,990,238 (DiZio et aL), (b) urethane release coating such as the class of polymers disclosed in U.S. Pat. No. 2,532,011 (Dahlquist), (c) silicone polyurea release coating such as the class of polymers described in U.S. Pat. No. 5,290,615 (Tushaus et al), and (d) combinations thereof. In a preferred embodiment, the ink repellent coating is transparent and has a dry coating thickness of less than 10 micrometers, preferably 2 to 3 micrometers.

U.S. Pat. No. 5,990,238 discloses a release coating composition that includes a polymer containing a polyethylene backbone having substituents attached thereto. Preferably, the substituents include a urethane linked nitrogen-bonded hydrocarbon side chain having about 5 carbon atoms or more in length and a terminal methyl group; and an oxygen linked water solubilizing group. The substituents may further include hydrogen; a hydroxyl; a halide; an alkylene, an alkenylene, an alkynylene, an arylene group, or mixtures thereof, having a terminal hydroxyl group;

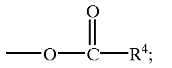

—O—$R^5$;—$R^6$; or mixtures thereof; wherein each $R^4$, $R^5$, and $R^6$ is independently selected from the group of an aliphatic group, an aromatic group, and mixtures thereof.

A water solubilizing group is a functionality capable of being ionized or is the ionized form thereof, which can either be anionic or cationic. For example, the water solubilizing group may include an acidic group capable of forming an anionic species. Preferably, when the water solubilizing group contains an anion, it is selected from the group of $—OSO_2O^-$, $—SO_2O^-$, $—CO_2^-$, $(—O)_2P(O)O^-$, $—OP(O)(O^-)_2$, $—P(O)(O^-)_2$, $—P(O^-)_2$, and $—PO(O^-)_2$. Equally preferable is a water solubilizing group containing a cation selected from the group of $—NH(R^8)_2^+$ and $—N(R^8)_3^+$, wherein $R^8$ is selected from the group of a phenyl group; a cycloaliphatic group; and a straight or branched aliphatic group having about 1 to 12 carbon atoms.

The release coating composition of U.S. Pat. No. 5,990,238 may be coated from an organic solvent, water, or mixtures thereof. Thus, the release coating composition may contain organic solvents, preferably selected from the group of an aromatic hydrocarbon, an ester, an aliphatic hydrocarbon, an alcohol, a ketone, and mixtures thereof; or it may contain water.

U.S. Pat. No. 5,290,615 provides release coating of organosiloxane-polyurea block copolymers, which are segmented copolymers of the $(AB)_n$, type. They are obtained through a condensation polymerization of a difunctional organopolysiloxane amine (which produces soft segment), with little contamination from monofunctional or nonfunctional siloxane impurities, with a diisocyanate (which produces a hard segment) and may include a difunctional chain extender such as a difunctional amine or alcohol, or a mixture thereof. For a specific description of the block copolymer, see U.S. Pat. No. 5,290,615 at column 1, line 67 to column 2, line 42. Methods of making the block copolymer are also disclosed.

Ink Receptive Coatings

Inkjet ink receptive coatings may comprise one or more layers of any suitable hydrophilic polymer or blend of polymers including, substituted polyurethanes, polyvinyl alcohol and substituted polyvinyl alcohols, polyvinyl pyrrolidone and substituted polyvinyl pyrrolidones, vinyl pyrrolidone/vinyl acetate copolymer, vinyl acetate/acrylic copolymers, acrylic acid polymers and copolymers, acrylamide polymers and copolymers, cellulosic polymers and copolymers, styrene copolymers of allyl alcohol, acrylic acid, maleic acid, esters or anhydride, and the like, alkylene oxide polymers and copolymers, gelatins and modified gelatins, and polysaccharides. Preferred hydrophilic polymers include polyvinyl pyrrolidone and substituted polyvinyl pyrrolidones; polyvinyl alcohol and substituted polyvinyl alcohols; vinyl pyrrolidone/-vinyl acetate copolymer; vinyl acetate/acrylic copolymer; polyacrylic acid; polyacrylamides; alkylhydroxyalkylcellulose; carboxyethylcellulose; gelatin; and polysaccharides.

Secondary additives may be incorporated into the inkjet receptive coating. Illustrative additives include, but are not limited to, mordants, water insoluble particles, plasticizers, antistatic agents, fade inhibitors (for image color brightness), fillers, crosslinking agents and antimicrobial agents.

Mordants may be used to control dye diffusion. Typical mordants include cationic materials such as amines and substituted amines, including quaternary ammonium salts. U.S. Pat. No. 5,342,688 (Kitchen et aL) discloses a useful polymeric mordant comprising a guanidine functionality as described throughout the patent, e.g., from column 3, line 32 to column 4, line 16.

Water insoluble particles are known for use as matting agents to control the frictional characteristics of image receptor sheets for reliable sheet-feeding through printing equipment. Suitable particulate materials may be derived from organic polymers such as polymethylmethacrylate; polystyrene; polyureaformaldehyde; and starch powders; and inorganic materials including silica; alumina; and metal silicates.

Plasticizers can be used to control the tendency of the coating to curl at low humidity. Illustrative plasticizers include, but are not limited to, polyethylene glycols, polyhydric alcohols, reduced sugars and the like.

Antistatic agents such as CYASTAT 609 or CYASTAT SN (available from American Cyanamid) prevent static charging of the film.

Fade inhibitors may be used to stabilize the image dyes against degradation with time. Suitable fade inhibitors include antioxidants such as IRGANOX 1010 available from Ciba Geigy.

Fillers may be used to modify the mechanical properties of the coating, provided that such materials do not compromise the transparency of the layer. Suitable materials include colloidal silica and alumina.

Crosslinking silanes, aziridines and the like may be used to modify the mechanical properties of the coating.

Antimicrobial agents such as ACTICIDE MV available from Actichem Inc. may be incorporated into the receptor layer.

Test for Surface Energy

The surface energy (in units of millijoules per square meter, $mJ/m^2$) is calculated from the measured advancing contact angles of water and methylene iodide and the known surface tensions of these liquids, using the geometric mean equation, as described in Souheng Wu, *Polymer Interface and Adhesion,* p. 178–181, 1982, published by Marcel Dekker, Inc.

Contact angle measurements were made using the sessile drop method with a Ramé Hart goniometer equipped with an environmental chamber. Water and methylene iodide used for contact angle measurements were distilled. Advancing contact angles were obtained by increasing or decreasing the drop volume until the three-phase boundary moved over the coating surface. The capillary pipette of the microsyringe was kept immersed in the drop during the measurement. The contact angle was the averages of measurements made on 4 to 6 different drops.

EXAMPLES

The following examples further illustrate various specific features, advantages, and other details of the invention. The particular materials and amounts recited in these examples, as well as other conditions and details, should not be construed in a manner that would unduly limit the scope of this invention. Percentages given are by weight, unless otherwise specified.

Preparation of Ink Receptive Coating

In Examples 1 to 6, the following ink receptive coating composition was applied to a first surface of a biaxially oriented polyethylene terephthalate (PET) film having a thickness of about 120 micrometer. After coating and drying in a forced air oven, the coated PET films were cut into 8.5×11-inch sheets.

| | |
|---|---|
| hydroxypropylmethylcellulose | 5.6% |
| colloidal hydrated alumina | 3.0% |
| xylitol | 1.0% |
| P134-Cl (polymeric mordant) | 0.3% |
| 30 $\mu$m polymethylmethacrylate microspheres | 0.1% |
| water | 90.0% |

COMPARATIVE EXAMPLE 1

Comparative Example 1 was polyethylene terephthalate film that contained the ink receptive coating on the first surface but no ink repellent coating on the second surface of the film.

EXAMPLES 2 to 6

Preparation of Ink Repellent Coatings

In Examples 2 to 6, various formulations of ink repellent coatings were coated onto biaxially oriented PET film, 120 micrometer ($\mu$m) thick, on the opposite side of the ink receptive coating. Coating thickness after drying in a hot air oven was from 0.2 to 0.3 $\mu$m.

The components used in these examples are detailed in Table 1.

TABLE 1

| Components | Supplier |
|---|---|
| silicone diamine (MW 900) | General Electric |
| silicone diamine (MW 5000) | made according to U.S. Pat. No. 5,214,119 |
| silicone diamine (MW 10,000) | made according to U.S. Pat. No. 5,214,119 |
| diaminopentane | DuPont under DYTEK A mark |
| isophorone diisocyanate | Crenova, Inc. |
| tetramethyl xylene diisocyanate | Cytec Industries, Inc. |
| isopropyl alcohol | Aldrich Chemical Co. |
| n-butanol | Aldrich Chemical Co. |
| polyvinyl N-octadecyl carbamate | made according to U.S. Pat. No. 5,990,238 |
| polyvinylalcohol | Air Products and Chemicals, Inc. |
| polymethylmethacrylate microspheres | made according to U.S. Pat. No. 5,238,736 |
| GEMTEX 680 | dihexyl sulfosuccinate surfactant, Finetex, Inc. |
| JEFFAMINE DU700 (PPO MW 900) | polypropylene oxide diamine, Huntsman Corp. |

| | |
|---|---|
| Example 2 (silicone polyurea LAB) | |
| silicone diamine (MW 5000) | 2.0% |
| JEFFAMINE DU700 (PPO MW 900) | 2.5% |
| diamino pentane (1.65%)/isophorone diisocyanate (3.85%) | 5.5% |
| isopropyl alcohol | 87.3% |
| n-butanol | 2.7% |

-continued

| | |
|---|---|
| Example 3 (silicone polyurea LAB) | |
| silicone diamine (MW 900) | 7.9% |
| tetramethyl xylene diisocyanate | 2.1% |
| isopropyl alcohol | 87.3% |
| n-butanol | 2.7% |
| Example 4 (silicone polyurea LAB) | |
| silicone diamine (MW 10,000) | 9.76% |
| tetramethyl xylene diisocyanate | 0.24% |
| isopropyl alcohol | 87.3% |
| n-butanol | 2.7% |
| Example 5 (waterborne urethane LAB) | |
| polyvinyl N-octadecyl carbamate | 9.65% |
| polyvinylalcohol | 0.3% |
| GEMTEX 680 | 0.05% |
| water | 90.0% |
| Surface energy | 23 $mJ/m^2$ |
| Example 6 (silicone polyurea LAB) | |
| silicone diamine (MW 900) | 7.8% |
| tetramethyl xylene diisocyanate | 2.1% |
| 1.5 $\mu$m polymethylmethacrylate microspheres | 0.1% |
| isopropyl alcohol | 87.3% |
| n-butanol | 2.7% |

Image Transfer (Offset) Evaluation

The first side of the substrates of Examples 1 to 6 (i.e., the side coated with the ink receptive composition) was imaged in transparency mode using a Hewlett Packard (HP) model 2000C inkjet printer to produce blocks of red, green, blue and black ink droplets of maximum available densities. The imaged sheets were immediately stacked with the still-wet image in contact with the ink repellent backside coating of a second sheet of each example. The weight of twelve additional dual-side coated sheets was added and the resulting stacks were left for 24 hours at room temperature (23° to 25° C.) before separating the imaged surface from the backside coating. The percentage of the black printed area that had offset by transfer across the interface between the ink receptive coating and the ink repellent backside coating was estimated visually to provide the following results.

| | |
|---|---|
| Comparative Example 1 | almost complete ink transfer* (about 100% transfer) |
| Example 2 | less than half ink transfer (about 40% transfer) |
| Example 3 | more than three-quarters ink transfer (about 80% transfer) |
| Example 4 | three-quarters ink transfer (about 75% transfer) |
| Example 5 | substantially no ink transfer (nearly 0% transfer) |
| Example 6 | minimal ink transfer (less than 10% transfer) |

*Ink transfer indicates the amount of ink transferring to the ink repellent coating.

Although Examples 2, 3, and 4 showed ink transfer, they showed less transfer than Comparative Example 1. It should be noted that this particular evaluation was intended to be very rigorous with stacking left for 24 hours. It is likely that under less rigorous conditions, Examples 2, 3, and 4 would exhibit only minor ink transfer, if any at all.

Imaging of Inkjet Ink and Toner Powder Receptors

In one embodiment, the inventive image receptor sheet contains an ink repellent coating that not only substantially eliminates ink transfer between stacked imaged sheets, but also provides a toner powder receptive surface suitable for use with electrophotographic printers (commonly referred to as laser printers). As a receptor for differing types of image forming materials, i.e. liquid ink and toner powder, the inventive receptor sheets provide convenient, versatile, multipurpose imageable elements that may be used with either inkjet printers of laser printers.

The versatility of these receptor sheets was demonstrated by recording images on a variety of types of printers and copiers identified below.

EXAMPLE 9

Biaxially oriented PET film 120 μm thick was coated on one side with an ink receptive coating (detailed below) having a coating thickness of about 9.0 μm after drying in a hot air over. An ink repellent toner powder receptive coating was applied to the opposite side of the film to provide a similarly dried coating of about 0.3 μm.

Ink Receptive Coating Composition

| | |
|---|---|
| hydroxypropylmethylcellulose | 5.6% |
| colloidal hydrated alumina | 3.0% |
| xylitol | 1.0% |
| P134-Cl (polymeric mordant) | 0.3% |
| 30 μm polymethylmethacrylate microspheres | 0.1% |
| water | 90.0% |

Ink Repellent, Toner Powder Receptive Coating Composition

| | |
|---|---|
| isobornylacrylate/methylmethacrylate/ethylacrylate latex | 4.15% |
| N-beta-(aminoethyl)-gamma-aminopropyltrimethoxysilane | 0.02% |
| CYASTAT 609 (antistatic agent available from American Cyanamid) | 0.06% |
| 4 μm polystearylmethacrylate microspheres | 0.05% |
| water | 95.71% |

After coating on both sides of the PET film to yield image receptor sheets, they were cut into 8.5x11-inch sheets and tested as follows.

The side of the receptor sheet coated with ink receptive composition was imaged with a test chart in the following inkjet printers: HP 720C, HP 840C, HP 850C, HP 895C, HP 932C, HP 970C, HP 1220C, HP 2000, and a HP 2500C; Canon BJC 2000, Canon BJC 4302, Canon BJC 6000, and a Canon BJC 8200; Lexmark PM 100 and Lexmark 5770; Epson Stylus 740, Epson Stylus 870 and Epson Stylus 900. In all cases a sharp, colorful image on a clear background was produced.

The side of the sheet coated with the toner powder receptive composition was imaged with a test chart in the following electrophotographic copiers and printers: (1) monochrome (Black & White Copiers)—Xerox 5053; Canon 6030; Lanier 6514 and Lanier 7365, (2) monochrome laser printers—HP 2; HP 2P; HP 4; HP 4M Plus; HP 4SI; HP 5; and HP 5SI, (3) color copiers—Xerox 5765; Xerox 5790; Canon 700; and Canon 1000, (4) color laser printers—HP 8500; HP Color Laserjet 5; HP Color Laserjet 4500, Tektronix 560; Tektronix 750; Tektronix Phaser 740, Tektronix Phaser 780.

In all cases a sharp images were produced against a clear background. Colored images exhibited good color density and uniformity.

Ink receptive coatings and toner powder receptive coatings for application to film substrates have been described herein. These and other variations, which will be appreciated by those skilled in the art, are within the intended scope of this invention as claimed below. As previously stated, detailed embodiments of the present invention are disclosed herein; however, it is to be understood that the disclosed embodiments are merely exemplary of the invention that may be embodied in various forms.

All references cited herein are incorporated by reference in each reference's entirety.

What is claimed is:

1. An image receptor sheet comprising:

(a) a film substrate having a first side opposite a second side;

(b) an ink receptive coating disposed on said first side; and (c) an ink repellent layer disposed on said second side to prevent transfer of ink from said first side to said second side, said ink repellent layer comprising a polymeric composition having a surface energy less than about 30 $mJ/m^2$.

2. The image receptor sheet of claim 1, wherein said ink repellent layer further comprises insoluble particulate fillers.

3. The image receptor sheet of claim 1 wherein said substrate is transparent biaxially oriented polyethylene terephthalate.

4. The image receptor sheet of claim 1, wherein said ink repellent layer is a polymeric composition selected from the group consisting of urethane release coating, waterborne polyurethane release coating, silicone polyurea release coating, and combinations thereof.

5. The image receptor sheet of claim 2, wherein said insoluble particulate filler is water insoluble and is selected from the group consisting of polymethylmethacrylate, polystyrene, and polyureaformaldehyde microspheres.

6. The image receptor sheet of claim 1, wherein said ink receptive coating is selected from the group consisting of polyvinyl pyrrolidone and substituted polyvinyl pyrrolidones; polyvinyl alcohol and substituted polyvinyl alcohols, vinyl pyrrolidone/vinyl acetate copolymer, vinyl acetate/acrylic copolymer, polyacrylic acid, polyacrylamides, alkylhydroxyalkylcellulose, carboxyethylcellulose, gelatin, polysaccharides, and combinations thereof.

7. The image receptor sheet of claim 1, wherein said ink receptive coating further comprises secondary additives selected from the group consisting of mordants, plasticizers, antistatic agents, fade inhibitors, fillers, crosslinking agents, and antimicrobial agents.

8. The image receptor sheet of claim 1, wherein said ink receptive layer and ink repellent layer are transparent.

* * * * *